Patented May 9, 1944

2,348,443

UNITED STATES PATENT OFFICE 2,348,443

PROCESS FOR CONCENTRATING CAROTENE

Harold M. Barnett, Long Beach, Calif.

No Drawing. Application June 7, 1943,
Serial No. 489,989

4 Claims. (Cl. 260—666)

This invention relates to the preparation of carotene in concentrated form from vegetable materials.

One object of the invention is to provide a process for the economical concentration of carotene from vegetable sources. Another object is to provide a stable dry vegetable concentrate having high carotene content. Still another object is to provide an aqueous carotene concentrate.

I have discovered that the carotene content of thoroughly pulped fresh vegetables such as carrots may be almost completely removed by a suitable water elutriation process, and when the process is carried out with a minimum amount of water, followed by subsequent coagulation, the carotene may be concentrated to as much as 50 to 200 or more times the original concentration in the carrots.

My process will be illustrated by the preparation of carotene from carrots, although the process is applicable to other vegetable materials having carotene content such as tomatoes, alfalfa, sweet potatoes, and the like.

The fresh carrots are reduced to a pulp by any suitable mechanical process, such as by passing them through a hammer mill preferably without using added water or other liquid. It is important that the structure be well broken down so that the carotene particles are released from the fiber and other materials. The semi-liquid mass or pulp is distributed in a thin layer on a moving foraminous belt such as a screen belt, and jets of water are forced against the pulp on the belt. The carotene and carotene-containing particles are insoluble in water, and are small enough— some being of colloidal dimensions—to be carried through the screen openings with the water. The action of the jets is to physically disentangle the carotene particles from the fiber and to carry them through the screen, with avoidance of formation of a mat of fibers on the screen which would act as a filter and hold back or entrap the carotene particles. I have found that a screen of about 40 mesh is satisfactory for carrots, but the screen opening may be varied for different pulps. The minimum amount of water is used which will separate out a high percentage of the carotene particles. A moving belt has been found advantageous to keep the amount of water to a minimum, but obviously other means may be used than those described here for illustration. When a belt is used, I have found that it is desirable to press out the water from the pulp at the end of the belt, using a roller or similar means for this purpose. The amount of water to be used varies with different vegetables and with different lots of varying qualities and textures. I have actually used up to 25 gallons of water to 100 pounds of carrot pulp. The carotene in the water from this elutriation or extraction process is then coagulated by heating with or without a coagulant, or by means of an added coagulant such as hydrochloric acid. When coagulated by heating alone, provided the dilution is not too great, the carotene with some other colloidal or fine materials collects at the top, while a precipitate forms when acid is used as the coagulant. If the dilution is too great, dependent upon the particular vegetable material being treated, an added coagulant is required. The coagulum is separated from the water medium by decantation, filtration, centrifuging, or other suitable method, and the resulting concentrate is in the form of a moist cake having 50 times or more, the carotene content of the original carrots.

The concentrate thus produced has an equivalent vitamin A content of from 2 to 10 million units per pound, and is free from undesirable odors or flavors which are encountered in the usual process in which carrots after dehydrating are extracted with a solvent such as petroleum ether. It is also free from the oxidation products of carotene or the materials associated with it. This concentrate contains beside carotene small amounts of cellulosic fiber, protein, oil, etc., but for most uses of carotene this extraneous material is merely a harmless diluent.

Because of the nature of the concentrate as above made, it is difficult to remove the last portion of the water, but this may be done by the use of reduced pressure evaporation, or by the use of or addition of desiccants. I have found that where the concentrate is to be used in foods and feeds, it may be brought to an apparently dry state by thoroughly mixing with a normally dry food or feed material, for example wheat by-products such as "middlings" or "shorts," which act as a desiccant for the carotene concentrate. The moisture content of the mixture is so reduced that no spoilage will take place. When wheat milling by-products are used as desiccant, the wheat germ oil which is contained therein aids in stabilizing the carotene against oxidation For example in one case I have added one part of moist concentrate containing eight million vitamin A units per pound, to seven parts of "shorts," producing a feed concentrate having carotene content equivalent to about one million vitamin A units per pound, which concentrate is dry, does not easily spoil, and readily mixes with other feed materials, in the preparation of mixed and fortified feeds. Other foods capable of taking up the extra moisture to give an apparently dry product may be used.

By avoiding the drying of the carrots, as commonly practiced, I greatly decrease the cost of getting the carotene from vegetable sources, and also make a product which is free from odors and flavors from the incompletely removed extracting solvents which have heretofore been employed, or the odors and flavors from dehydrated vegetables. Because of this freedom from undesired odors and flavors, my concentrate may be used as a food coloring material or as a source of vitamin A in the fortification of pharmaceutical products, foods, and feeds.

I claim:

1. The process of making a carotene concentrate comprising pulping a carotene-containing vegetable material, elutriating with a minimum amount of water to separate the carotene particles from the fibrous material, coagulating the carotene particles, and separating the coagulum from the excess water.

2. The process of making a carotene concentrate comprising pulping a carotene-containing vegetable material, elutriating with a minimum amount of water to separate the carotene particles from the fibrous material, coagulating the carotene particles, separating the coagulum from the excess water, and then desiccating the coagulum.

3. The process of making a carotene concentrate comprising pulping a carotene-containing vegetable material, elutriating with a minimum amount of water to separate the carotene particles from the fibrous material, adding sufficient acid to form a coagulum containing the carotene, and separating the coagulum from the excess water.

4. The process of making a carotene concentrate comprising pulping a carotene-containing vegetable material, elutriating with a minimum amount of water to separate the carotene particles from fibrous material, heating to form a coagulum containing the carotene, and separating the coagulum from the excess water.

HAROLD M. BARNETT.